(12) United States Patent
Heinz (10) Patent No.: US 7,634,764 B2
(45) Date of Patent: Dec. 15, 2009

(54) METHOD AND SYSTEM FOR FLEXIBLE/EXTENDABLE AT COMMAND INTERPRETER

(75) Inventor: Gary Heinz, San Leandro, CA (US)

(73) Assignee: Broadcom Corporation

( * ) Notice: Subject to any disclaimer, the term of this patent is extended or adjusted under 35 U.S.C. 154(b) by 546 days.

(21) Appl. No.: 10/926,620

(22) Filed: Aug. 26, 2004

(65) Prior Publication Data

US 2005/0273774 A1    Dec. 8, 2005

Related U.S. Application Data (60) Provisional application No. 60/577,109, filed on Jun. 4, 2004.

(51) Int. Cl.
    *G06F 9/45* (2006.01)
(52) U.S. Cl. .................. 717/140; 717/136; 717/142; 717/143
(58) Field of Classification Search ................. 375/222; 703/26; 717/136, 137, 140–148
    See application file for complete search history.

(56) References Cited

U.S. PATENT DOCUMENTS

| | | | | |
|---|---|---|---|---|
| 4,730,258 A | * | 3/1988 | Takeda et al. ............... 700/86 |
| 4,905,138 A | * | 2/1990 | Bourne ...................... 717/139 |
| 5,202,899 A | * | 4/1993 | Walsh ....................... 375/222 |
| 5,384,845 A | * | 1/1995 | Lopatin et al. .............. 380/270 |
| 5,574,888 A | * | 11/1996 | Panditji et al. ............... 703/26 |
| 5,815,682 A | * | 9/1998 | Williams et al. .............. 703/25 |
| 6,023,473 A | * | 2/2000 | Reine et al. ................. 370/463 |
| 6,035,019 A | * | 3/2000 | Hara ....................... 379/93.05 |
| 6,862,708 B1 | * | 3/2005 | Higginbotham et al. ..... 715/500 |
| 7,076,772 B2 | * | 7/2006 | Zatloukal ................... 717/147 |
| 2003/0126195 A1 | * | 7/2003 | Reynolds et al. ............ 709/203 |
| 2004/0216138 A1 | * | 10/2004 | Pankovcin et al. .......... 719/320 |

OTHER PUBLICATIONS

Hiroo Umeno, "For the Telephony API, Press 1; For Unimodem, Press 2; or Stay on the Line", Apr. 1998, Microsoft Systems Journal.*
Steven Muchnick, "Advanced Compiler Design and Implementation", 1997, Academic Press, p. 1.*

(Continued)

*Primary Examiner*—Lewis A Bullock, Jr.
*Assistant Examiner*—Jue S Wang
(74) *Attorney, Agent, or Firm*—McAndrews, Held & Malloy, Ltd.

(57) ABSTRACT

In a wireless communications device, methods and systems for processing a plurality of AT commands are disclosed. Aspects of the method may comprise generating AT command codes for the plurality of AT commands. The generated AT command codes for the plurality of AT commands may be compiled and linked with operating code. The linked AT commands and operating code may be executed. At least one command definition corresponding to at least one of the plurality of AT commands may be generated. The plurality of AT commands may be arranged according to the generated command definition. At least one pattern within at least a portion of the arranged plurality of AT commands may be selected and at least one command expression may be matched with the selected at least one pattern. The AT command codes for the plurality of AT commands may be generated utilizing the matched at least one command expression. At least one AT command execution information corresponding to the at least one of the plurality of AT commands may be generated.

30 Claims, 5 Drawing Sheets

OTHER PUBLICATIONS

Microsoft Corporation, "Microsot Computer Dictionary, Fifth Edition", May 2002, Microsoft Press, definition of code.*
Microsoft Corporation, "Microsoft Computer Dictionary, Fifth Edition", May 2002, Microsoft Press, definition of source code, programming language, dll.*
Shepherd et al., "Programming with Microsoft Visual C++.NET", Oct. 2002, Microsoft Press, Chapter 20.*
MSDN, "Microsoft Windows CE 3.0", Apr. 2, 2004, retrieved from: http://msdn.microsoft.com/en-us/library/aa454154.aspx.*

* cited by examiner

METHOD AND SYSTEM FOR FLEXIBLE/EXTENDABLE AT COMMAND INTERPRETER

CROSS-REFERENCE TO RELATED APPLICATIONS/INCORPORATION BY REFERENCE

This application makes reference to, claims priority to, and claims the benefit of U.S. Provisional Patent Application 60/577,109, filed on Jun. 4, 2004 and entitled "Method And System For Flexible/Extendable AT Command Interpreter," the complete subject matter of which is hereby incorporated herein by reference in its entirety.

FIELD OF THE INVENTION

Certain embodiments of the invention relate to processing command definitions used for communicating between two devices. More specifically, certain embodiments of the invention relate to a method and system for processing a plurality of AT commands

BACKGROUND OF THE INVENTION

The Hayes AT command set that is widely used by modems to communicate with computers may also be utilized by wireless devices, such as wireless telephones, to communicate with wireless networks, for example. The AT prefix, also known as the Attention Code, signals a modem and/or a wireless device that one or more commands are to follow. The commands following the AT prefix, or the AT commands, may be represented by a character string and are industry standard language used to communicate with the modem and/or the wireless device. Most communications applications have a user-friendly interface that does not display the AT commands to a user. Instead, when an AT command is issued transparently to a user, the receiving device may respond with a function call, such as a message that may be displayed on a screen, for example.

AT command sets may be utilized in wireless handsets to communicate with a personal computer (PC) and/or other host systems. For example, AT commands may be utilized to enable General Packet Radio Service (GPRS) web browsing capabilities on wireless handsets. The character string representing the AT command following the AT prefix may comprise a list of parameters. In order for a wireless handset to execute the AT command, the AT command parameters may need to be scanned and converted into a digital format recognizable by the handset.

One conventional approach that may be utilized in converting the AT command parameters is to use C code to read the character string of an AT command parameter, convert it and communicate it for further processing. A second conventional approach for parsing AT command parameters is by utilizing unix utilities such as lex and yacc. Both conventional approaches, however, are time-consuming, burdensome to implement and can be error-prone. In addition, the AT command parameters may not be modified and new commands may not be introduced if the conventional methods of converting AT command parameters are utilized.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for processing a plurality of AT commands. Aspects of the method may comprise generating corresponding AT command codes for the plurality of AT commands. The generated AT command codes for the plurality of AT commands may be compiled and linked with operating code. The linked AT commands and operating code may be executed. At least one command definition corresponding to at least one of the plurality of AT commands may be generated. The plurality of AT commands may be arranged according to the generated command definition. At least one pattern within at least a portion of the arranged plurality of AT commands may be selected and at least one command expression may be matched with the selected at least one pattern.

The AT command codes for the plurality of AT commands may be generated utilizing the matched command expression. At least one AT command execution information corresponding to the at least one of the plurality of AT commands may be generated. Whenever one of the AT commands is asserted, at least a portion of the linked AT commands and operating code may be executed according to the generated AT command execution information. The generated AT command execution information may comprise function call information. The compiled AT command codes may be verified prior to linking.

Another embodiment of the invention may provide a machine-readable storage, having stored thereon, a computer program having at least one code section executable by a machine, thereby causing the machine to perform the steps as described above, for processing a plurality of AT commands.

The system for processing a plurality of AT commands may comprise at least one processor that generates AT command codes for the plurality of AT commands. The processor may compile the generated AT command codes for the plurality of AT commands and link the compiled AT command codes with operating code. The processor may execute the linked AT commands and operating code. At least one command definition corresponding to one of the AT commands may be generated by the processor, which may arrange the AT commands according to the generated command definition. The processor may select at least one pattern within at least a portion of the arranged plurality of AT commands and may match at least one command expression with the selected at least one pattern.

The processor may generate the AT command codes for the plurality of AT commands utilizing the matched at least one command expression. The processor may generate AT command execution information corresponding to one of the AT commands. If at least one of the AT commands is asserted, the processor may execute at least a portion of the linked AT commands and operating code based on the generated AT command execution information. The generated AT command execution information may comprise function call information. The processor may also be adapted to verify the compiled AT command codes prior to the linking.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for processing a plurality of AT commands. One or more AT commands may be generated. After generating the AT command definitions, AT command codes may be generated. During the AT command codes generation, a hash table generator may be utilized to sort the plurality of AT commands according to the generated AT command definitions. In this manner, the hash table generator may provide a list of the AT commands where the first AT command on the list may correspond to the first generated AT command definition. The generated list of AT commands may be sorted so that the list of AT commands may be accessed in an efficient manner.

After performing lexical analysis of the AT command definition scripts and building a hash table, code containing sorting information and command characteristics may be generated. The generated code may sort the list of AT commands in accordance with a generated AT command definition. A parser may then parse the AT command list and may match one or more patterns within the AT command list. The matched patterns, also referred to as regular expressions, may then be utilized to encode one or more AT commands corresponding to the generated AT command definitions, thus generating AT command code. After AT command code is generated, it may be compiled. In one aspect of the invention, a C code compiler may be utilized to compile the AT command code. The compiled AT command code may be communicated to a wireless device, such as a handset, and may be further verified. For example, a regular expressions parser within the wireless device may be utilized to verify the compiled AT command code. After the compiled AT command code is verified, it may be compiled and linked with operating code, and the linked AT command code and operating code may be executed by the wireless device.

In another aspect of the invention, the AT command definition list may be customizable. For example, a system for processing a plurality of AT commands may be adapted to acquire new AT command definitions and/or to modify existing AT command definitions. Each AT command definition may be associated with an AT command and function call information. The function call information may correspond to execution of one or more command sequences, if the corresponding AT command is asserted. For example, function call information may indicate a wireless device function response, which may be initiated if the corresponding AT command is asserted.

Figure 1:
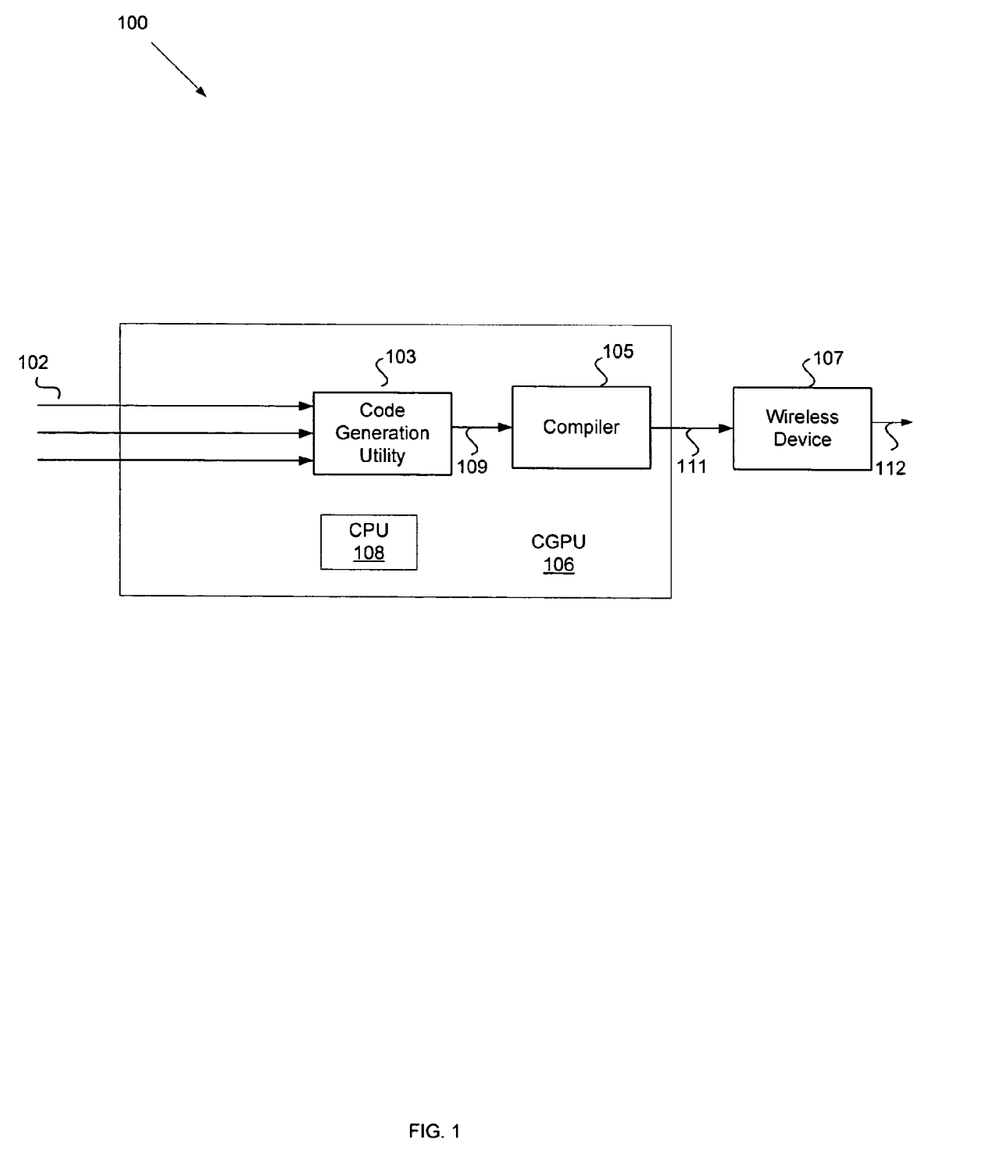
FIG. 1 is a block diagram of an exemplary AT command processing system, in accordance with an embodiment of the invention.

FIG. 1 is a block diagram of an exemplary AT command processing system, in accordance with an embodiment of the invention. Referring to FIG. 1, the AT command processing system 100 may comprise a code generation and processing unit (CGPU) 106 and a wireless device 107. The CGPU 106 may comprise a command script parser 113, a code generation utility 103, a compiler 105 and a central processing unit (CPU) 108.

The CGPU 106 may be adapted to receive one or more AT command definition scripts 102 as input. The AT command definition scripts 102 may comprise code for generating definitions of AT commands utilized in the AT command processing system 100. The AT command definition scripts 102 may comprise one or more definitions for a specific AT command, as well as function call information related to the specific AT command. In this manner, if the specific AT command is asserted, a function call may be initiated by the AT command processing system 100. In one aspect of the invention, multiple AT command definition scripts 102 may be combined by the AT command processing system 100, enabling definition of new AT commands to an existing set of commands. In this manner, third party developers may be enabled to customize the AT command language with new commands without modifying the original command set, thus avoiding risk of errors.

The AT command definition scripts 102 may be communicated for further processing to the CGPU 106. The CGPU 106 comprises suitable circuitry, logic and/or code and may be adapted to generate and compile AT command code. For example, the CGPU 106 may comprise a code generation utility 103 adapted to generate AT command code. More specifically, the AT command definition scripts 102, may be utilized by the code generation utility 103 to generate corresponding AT command code output 109. In one aspect of the invention, the code generation utility 103 comprises suitable circuitry, logic and/or code and may be adapted to convert the AT command definition scripts 102 into a C code output 109 for subsequent use by the compiler 105.

The compiler 105 comprises suitable circuitry, logic and/or code and may be adapted to compile the AT command code output 109 acquired from the code generation utility 103 and generate compiled AT command code 111. The compiled AT command code 111 may then be further processed by the wireless device 107. In another aspect of the invention, the compiler 105 may comprise a C code compiler. The CPU 108 may be utilized within the AT command processing system 100 to further facilitate AT command code generation by the code generation utility 103 and subsequent compiling by the compiler 105 and final linking and execution by the wireless device 107.

The wireless device 107 may be adapted to acquire and process compiled AT command code 111. For example, the wireless device 107 may initially verify the integrity of the compiled AT command code 111. In addition, the compiled AT command code 111 may be linked with operating code within the wireless device 107. The wireless device 107 may then execute the linked AT command code and operating code. If an AT command is asserted in the AT command processing system 100, the wireless device 107 may respond by initiating a corresponding function call 112, for example. The function call 112 may be executed in accordance with parameters defined with an AT command definition scripts 102, for example.

In operation, one or more AT command definitions may be defined in the AT command definition scripts 102. The AT command definitions may be associated with a specific AT command and may also comprise function call information related to the AT command. The function call information may correspond to one or more command sequences, which may be executed by the wireless device 107 if the specific AT command is asserted. The AT command definition scripts 102 may be communicated to the code generation utility 103 within the CGPU 106. The code generation utility 103 may then convert the AT command definition script information 102 into AT command code output 109. The AT command code output 109 may then be communicated to the compiler 105.

The compiler 105 may be adapted to compile the AT command code output 109 from the code generation utility 103 and output compiled AT command code 111 to the wireless device 107. The compiled AT command code 111 may be in a format suitable for processing by the wireless device 107. After receiving the compiled AT command code output 111, the wireless device 107 may verify the integrity of the compiled code. After the compiled AT command code is verified, it may be linked with operation code within the wireless device 107. The linked AT command code and operation code may then be executed. For example, a function call 112 may be initiated by the wireless device 107, where the function call 112 may be defined at the time of acquiring the AT command definitions 102.

Figure 2A:
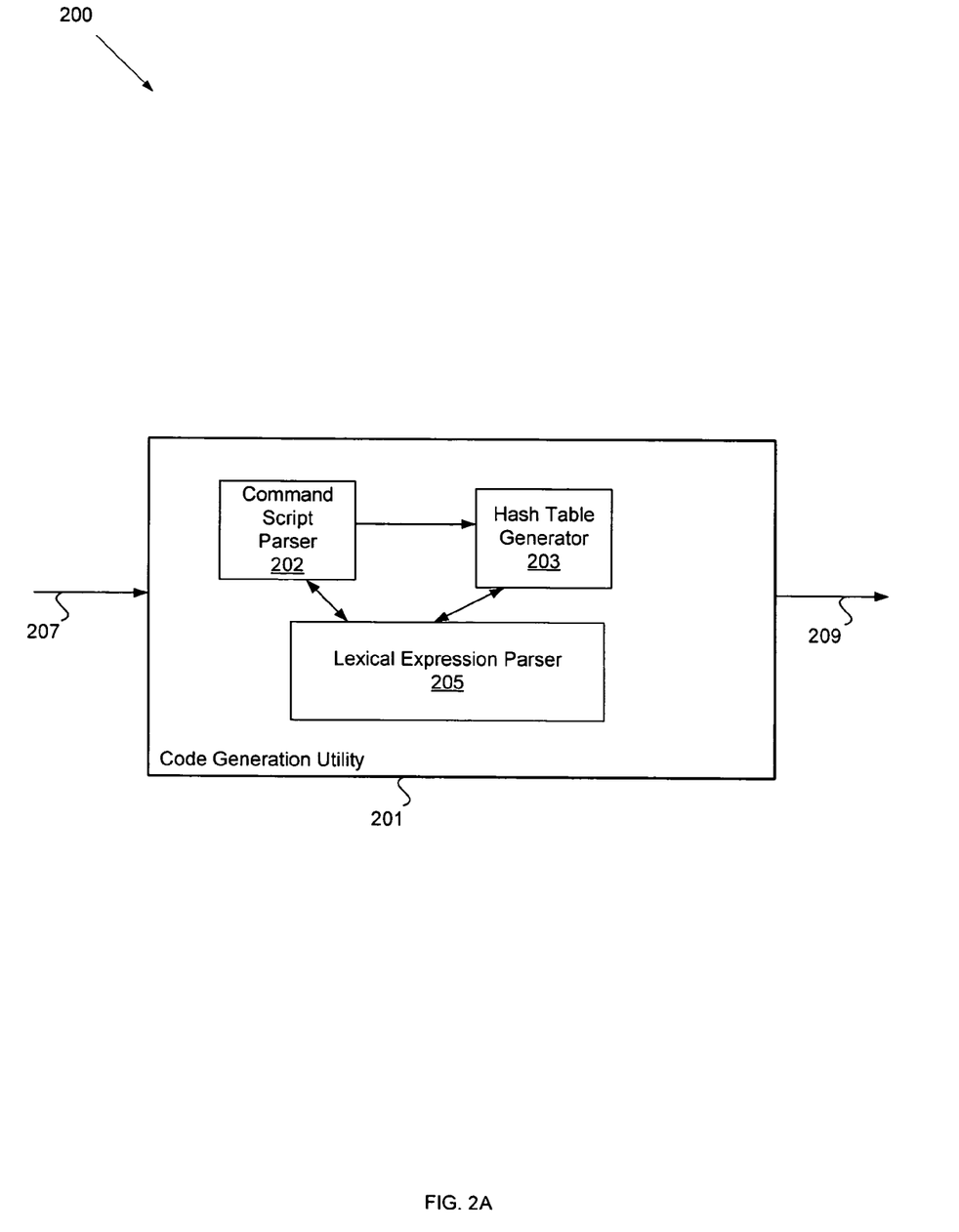
FIG. 2A is a block diagram of an exemplary code generation utility that may be utilized with the AT command processing system of FIG. 1, in accordance with an embodiment of the invention.

FIG. 2A is a block diagram 200 of an exemplary code generation utility that may be utilized with the AT command processing system of FIG. 1, in accordance with an embodiment of the invention. Referring to FIG. 2A, the code generation utility 201 may comprise a command script parser 202, a hash table generator 203 and a lexical expression parser 205. In addition, the code generation utility 201 may be adapted to receive AT command definition input 207 and generate AT command code output 209 for subsequent processing by a compiler, for example.

The command script parser 202 comprises suitable circuitry, logic and/or code and may be adapted to interpret a set AT command definitions into a table of AT commands suitable for sorting by a hash table generator. For example, the command script parser 202 may interpret the AT command definitions 207 into a table of AT commands suitable for sorting by the hash table generator 203. The command script parser 202 may be adapted to acquire one or more line entries from the AT command definitions 207 and split each command definition into a command and a command characteristic. The resulting command characteristic may comprise a command name, number of command parameters, range of command parameters, name of a command call function, etc.

The hash table generator 203 comprises suitable circuitry, logic and/or code and may be adapted to convert a set of interpreted AT commands into a table of AT command characteristics, thus enabling quick identification of AT commands by an efficient look-up routine. In one aspect of the invention, the hash table generator may store a table with existing AT commands. The AT commands table may be pre-sorted in accordance with the AT command definition input 207 within the AT command processing system. For example, an existing list of more than 200 AT commands within the hash table generator 203 may be presorted so that a quick access to one or more AT commands may be accomplished.

The lexical expression parser 205 comprises suitable circuitry, logic and/or code and may be adapted to utilize information from the hash table generator 203 to parse expressions. Lexical analysis by the lexical expression parser 205 may be associated with pattern matching syntax and may be utilized during conversion of the received AT command definition input 207 into the AT command code output 209.

In operation, the code generation utility 201 may acquire AT command definition scripts from the AT command definition input 207, for example. After acquiring the AT command definition scripts, the command script parser 202 and the hash table generator 203 may pre-sort an existing AT command table and generate code for the wireless device. In this manner, one or more AT commands may be quickly accessed by an efficient look-up routine.

Figure 2B:
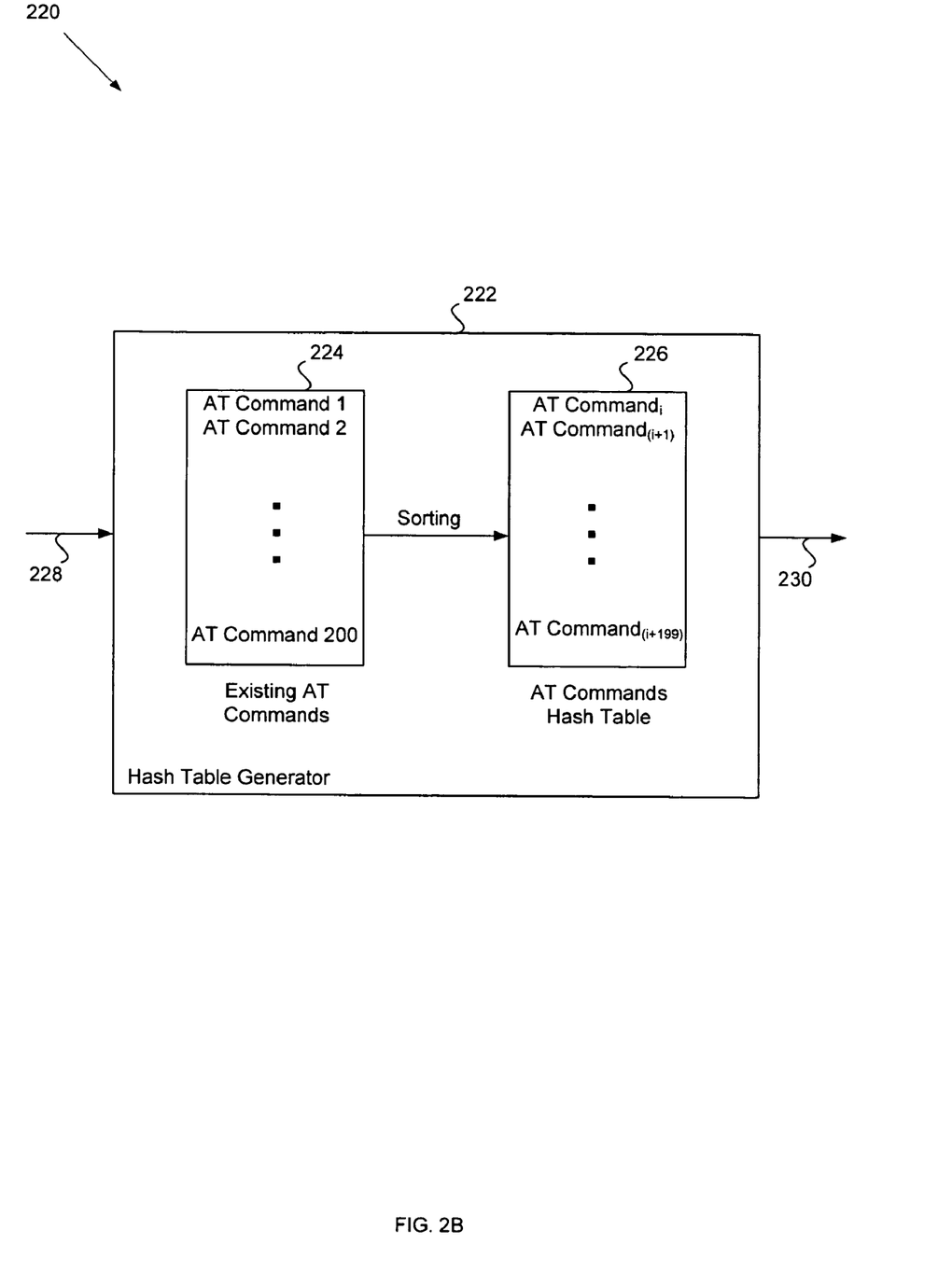
FIG. 2B is a block diagram of an exemplary hash table generator that may be utilized with the AT command processing system of FIG. 1, in accordance with an embodiment of the invention.

FIG. 2B is a block diagram 220 of an exemplary hash table generator that may be utilized with the AT command processing system of FIG. 1, in accordance with an embodiment of the invention. Referring to FIG. 2B, the hash table generator 222 may comprise an existing AT command table 224 and an AT commands hash table 226. In an illustrative embodiment of the invention, the existing AT command table 224 may comprise 200 existing AT commands, such as AT Command 1 through AT Command 200, listed in a determined order. Even though aspects of the invention contemplate use of 200 existing AT commands, the present invention is not limited in this manner. Additional AT commands may be defined, thus expanding the list of existing AT commands.

In operation, the hash table generator 222 may acquire AT command definition input 228 from an AT command definition generator, for example. Upon acquiring the AT command definition input 228, the hash table generator 222 may sort the AT commands within the existing AT command table 224 and may generate the AT commands hash table 226. The AT commands within the AT commands hash table 226, AT Command$_i$ through AT Command$_{(i+199)}$, may be sorted in accordance with the AT command definition input 228 so that a quick access to the AT commands defined by the AT command definition output 228 may be accomplished. One or more AT commands 230 from the sorted AT command table 226 may then be communicated to a lexical expression parser, for example, and utilized for analyzing expressions.

Figure 3:
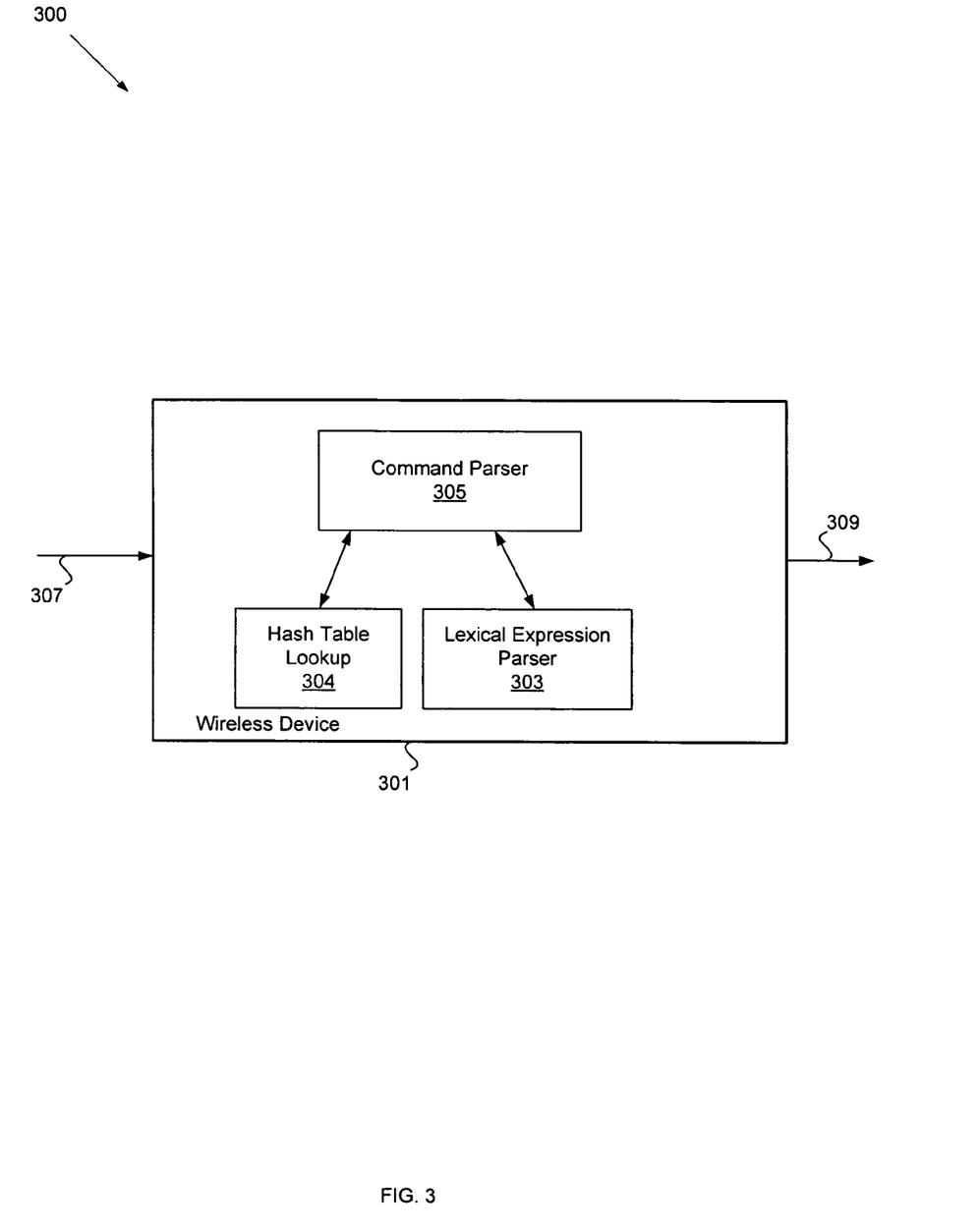
FIG. 3 is a block diagram of an exemplary wireless device that may be utilized with the exemplary AT command processing system of FIG. 1, in accordance with an embodiment of the invention.

FIG. 3 is a block diagram 300 of an exemplary wireless device that may be utilized with the exemplary AT command processing system of FIG. 1, in accordance with an embodiment of the invention. Referring to FIG. 3, the wireless device 301 may comprise a command parser 305, a lexical expression parser 303 and a hash table look-up block 304. The wireless device 301 may be adapted to receive a compiled code input 307. The compiled code input 307 may comprise compiled code generated by a compiler within an AT code generating and processing unit, for example. In one aspect of the invention, the compiled code input 307 may be generated by a compiler, such as the compiler 105 within the code generation and processing unit 106 of FIG. 1.

The lexical expression parser 303 comprises suitable circuitry, logic and/or code and may be adapted to evaluate lexical expressions. Lexical evaluation of expressions by the lexical expression parser 303 may be associated with pattern matching syntax and may be utilized by the wireless device 301 to verify the compiled code input 307. The verified compiled code input 308 may then be communicated to the command parser 305 for further processing.

The command parser 305 comprises suitable circuitry, logic and/or code and may be adapted to parse an AT command into its various components including command ID values and associated parameters. For example, a command ID value may be presented to the hash table look-up block 304 for validation and identification. In one aspect of the invention, the wireless device 301 may execute a function call 309, where the function call 309 may be executed if a corresponding AT command is asserted within the AT command processing system.

The hash table look-up block 304 comprises suitable circuitry, logic and/or code and may be adapted to perform an efficient look-up of an AT command ID from a pre-sorted table, validating and identifying the command. After the AT command is validated and identified, the associated command code may be executed by the wireless device 301. In one aspect of the invention, the wireless device 301 may execute a function call 309, where the function call 309 may be executed if a corresponding AT command is asserted within the AT command processing system.

Figure 4:
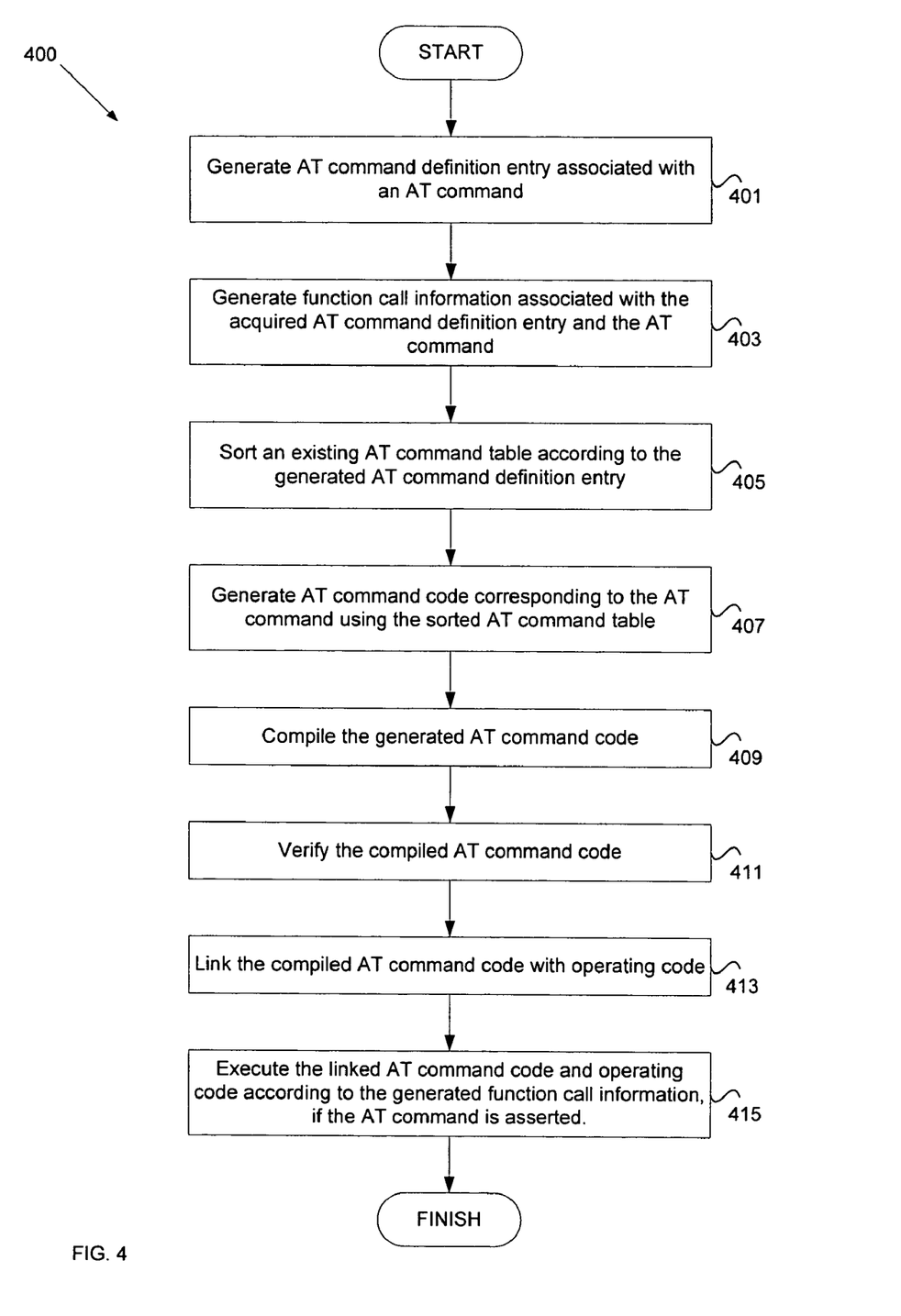
FIG. 4 is a flow diagram of an exemplary method for processing an AT command, in accordance with an embodiment of the invention.

FIG. 4 is a flow diagram 400 of an exemplary method for defining and processing AT commands, in accordance with an embodiment of the invention. Referring to FIG. 4, at 401, an AT command definition entry may be generated within an AT command processing system. The generated AT command definition entry may be associated with an AT command. At 403, function call information associated with the generated AT command definition entry and the AT command may be generated. For example, the defined function call information may indicate a sequence of executable commands, which may be executed if the AT command is selected. At 405, an existing AT command table may be sorted according to the generated AT command entry. At 407, AT command code corresponding to the AT command may be generated using the sorted AT command table. At 409, the generated AT command code may be compiled. For example, the generated AT command code may be compiled using a C code compiler. At 411, the compiled AT command code may be verified. For example, a lexical expressions parser within a wireless device may verify the compiled AT command code prior to linking. At 413, the verified compiled AT command code may be linked with operating code. At 415, the linked AT command code and operating code may be executed according to the generated function call information, if the AT command is asserted.

Referring again to FIG. 1, the CPU 108 may be adapted to generate AT command codes for a plurality of AT commands. The CPU 108 may compile the generated AT command codes for the plurality of AT commands and may link the compiled AT command codes with operating code. The CPU 108 may then execute the linked AT commands and operating code. The CPU 108 may generate at least one command definition corresponding to at least one of the plurality of AT commands and may arranges the plurality of AT commands according to the generated command definition. The CPU 108 may select at least one pattern within a portion of the arranged plurality of AT commands and may match a command expression with the selected pattern.

The CPU 108 may generate the AT command codes for the plurality of AT commands utilizing the matched at least one command expression. The CPU 108 may generate at least one AT command execution information corresponding to at least one of the plurality of AT commands. If one or more of the AT commands are asserted, the CPU 108 may execute at least a portion of the linked AT commands and operating code according to the generated AT command execution information. The generated AT command execution information may comprise function call information. The CPU 108 may verify the compiled AT command codes prior to the linking.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing a plurality of attention (AT) commands, the method comprising:
   receiving one or more AT command definition scripts comprising one or more definitions for specific AT commands and function call information associated with the specific AT commands, wherein the one or more AT command definition scripts provide definitions of new AT commands to an existing set of AT commands;
   generating AT command codes for the one or more AT command definition scripts, wherein said generated AT command codes are implemented in source code;
   compiling said source code of generated AT command codes for the one or more AT command definition scripts to generate compiled AT command codes;
   linking said compiled AT command codes with operating code; and
   executing said linked AT command codes and said operating code.

2. The method according to claim 1, comprising generating the one or more AT command definition scripts corresponding to at least one of the specific AT commands.

3. The method according to claim 2, comprising arranging the specific AT commands according to said generated command definition scripts.

4. The method according to claim 3, comprising selecting at least one pattern within at least a portion of said arranged specific AT commands.

5. The method according to claim 4, comprising matching at least one command expression with said selected at least one pattern.

6. The method according to claim 5, comprising generating said AT command codes for the specific AT commands utilizing said matched at least one command expression.

7. The method according to claim 2, comprising generating at least one AT command execution information corresponding to said at least one of the specific AT commands.

8. The method according to claim 7, comprising executing at least a portion of said linked AT commands and operating code according to said generated at least one AT command execution information, if said at least one of the specific AT commands is asserted.

9. The method according to claim 7, wherein said generated AT command execution information comprises a function call information.

10. The method according to claim 1, comprising verifying said compiled AT command codes prior to said linking.

11. A machine-readable storage having stored thereon, a computer program having at least one code section for processing a plurality of attention (AT) commands, the at least one code section being executable by a machine to perform steps comprising:
  receiving one or more AT command definition scripts comprising one or more definitions for specific AT commands and function call information associated with the specific AT commands, wherein the one or more AT command definition scripts provide definitions of new AT commands to an existing set of AT commands;
  generating AT command codes for the one or more AT command definition scripts, wherein said generated AT command codes are implemented in source code;
  compiling said source code of generated AT command codes for the one or more AT command definition scripts to generate compiled AT command codes;
  linking said compiled AT command codes with operating code; and
  executing said linked AT command codes and said operating code.

12. The machine-readable storage according to claim 11, comprising code for generating the one or more AT command definition scripts corresponding to at least one of the specific AT commands.

13. The machine-readable storage according to claim 12, comprising code for arranging the specific AT commands according to said generated command definition scripts.

14. The machine-readable storage according to claim 13, comprising code for selecting at least one pattern within at least a portion of said arranged specific AT commands.

15. The machine-readable storage according to claim 14, comprising code for matching at least one command expression with said selected at least one pattern.

16. The machine-readable storage according to claim 15, comprising code for generating said AT command codes for the specific AT commands utilizing said matched at least one command expression.

17. The machine-readable storage according to claim 12, comprising code for generating at least one AT command execution information corresponding to said at least one of the specific AT commands.

18. The machine-readable storage according to claim 17, comprising code for executing at least a portion of said linked AT commands and operating code according to said generated at least one AT command execution information, if said at least one of the specific AT commands is asserted.

19. The machine-readable storage according to claim 17, wherein said generated AT command execution information comprises a function call information.

20. The machine-readable storage according to claim 11, comprising code for verifying said compiled AT command codes prior to said linking.

21. A system for processing a plurality of attention (AT) commands, the system comprising:
  at least one processor that receives one or more AT command definition scripts comprising one or more definitions for specific AT commands and function call information associated with the specific AT commands, wherein the one or more AT command definition scripts provide definitions of new AT commands to an existing set of AT commands;
  said at least one processor generates AT command codes for the one or more AT command definition scripts, wherein said generated AT command codes are implemented in source code;
  said at least one processor compiles said source code of said generated AT command codes for the one or more AT command definition scripts to generate compiled AT command codes;
  said at least one processor links said compiled AT command codes with operating code; and
  said at least one processor executes said linked AT command codes and said operating code.

22. The system according to claim 21, wherein said at least one processor generates the one or more AT command definition scripts corresponding to at least one of the specific AT commands.

23. The system according to claim 22, wherein said at least one processor arranges the specific AT commands according to said generated command definition scripts.

24. The system according to claim 23, wherein said at least one processor selects at least one pattern within at least a portion of said arranged specific AT commands.

25. The system according to claim 24, wherein said at least one processor matches at least one command expression with said selected at least one pattern.

26. The system according to claim 25, wherein said at least one processor generates said AT command codes for the specific AT commands utilizing said matched at least one command expression.

27. The system according to claim 22, wherein said at least one processor generates at least one AT command execution information corresponding to said at least one of the specific AT commands.

28. The system according to claim 27, wherein said at least one processor executes at least a portion of said linked AT commands and operating code according to said generated at least one AT command execution information, if said at least one of the specific AT commands is asserted.

29. The system according to claim 27, wherein said generated AT command execution information comprises a function call information.

30. The system according to claim 21, wherein said at least one processor verifies said compiled AT command codes prior to said linking.

* * * * *

UNITED STATES PATENT AND TRADEMARK OFFICE
CERTIFICATE OF CORRECTION

| | | |
|---|---|---|
| PATENT NO. | : 7,634,764 B2 | Page 1 of 1 |
| APPLICATION NO. | : 10/926620 | |
| DATED | : December 15, 2009 | |
| INVENTOR(S) | : Gary Heinz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this
Fifteenth Day of March, 2011

David J. Kappos
*Director of the United States Patent and Trademark Office*